US006925159B1

(12) United States Patent
Blackburn et al.

(10) Patent No.: US 6,925,159 B1
(45) Date of Patent: Aug. 2, 2005

(54) SYSTEM AND METHOD OF BILLING A PREDETERMINED TELEPHONE LINE FOR SERVICE UTILIZED BY A CALLING PARTY

(75) Inventors: Connie Blackburn, Milpitas, CA (US); Joel Brand, Milpitas, CA (US); Douglas William Varney, Naperville, IL (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/512,838

(22) Filed: Feb. 25, 2000

Related U.S. Application Data

(60) Provisional application No. 60/121,736, filed on Feb. 26, 1999.

(51) Int. Cl.$^7$ .............................................. H04M 15/00
(52) U.S. Cl. .............................. 379/114.05; 379/114.01; 379/114.03; 379/114.21; 379/127.03
(58) Field of Search ............................... 379/70, 74, 79, 379/111, 112.01, 114.01, 114.03, 114.05, 114.21, 114.26, 114.27, 114.28, 127.03, 133, 201.01, 201.02, 207.02, 210.01, 212.01

(56) References Cited

U.S. PATENT DOCUMENTS

| | | | | |
|---|---|---|---|---|
| 4,625,081 A | | 11/1986 | Lotito et al. | ................... 379/88 |
| 5,058,152 A | | 10/1991 | Solomon et al. | ............... 379/67 |
| 5,339,352 A | * | 8/1994 | Armstrong et al. | ....... 379/88.01 |
| 5,406,616 A | | 4/1995 | Bjorndahl | ..................... 379/59 |

(Continued)

FOREIGN PATENT DOCUMENTS

| | | | | |
|---|---|---|---|---|
| EP | 0 481 683 A2 | 4/1992 | ............ | H04Q/7/04 |
| EP | 0543235 A2 | 5/1993 | ............ | H04Q/3/62 |
| EP | 0 679 005 A1 | 10/1995 | ............ | H04M/3/50 |
| EP | 0 856 979 A2 | 8/1998 | ............ | H04M/3/50 |
| EP | 0905959 A2 | 3/1999 | ............ | H04M/7/00 |
| GB | 2 252 014 A | 7/1992 | ............ | H04M/1/274 |

(Continued)

OTHER PUBLICATIONS

Chung–Hsien Wu, et al., "Speech Activated Telephony Email Reader (SATER) Based on Speaker Verification and Text–To–Speech Conversion", Institute of Information Engineering, IEEE Transactions on Consumer Electronics, vol. 43, No. 3, Aug. 1997, pp. 707–716.

(Continued)

*Primary Examiner*—Quoc Tran
(74) *Attorney, Agent, or Firm*—Haverstock & Owens LLP

(57) ABSTRACT

A billing system and method automatically charges a call to a predetermined telephone line wherein the call is placed by a calling part through a service. This service is any one or combination of a voice mail system, a call forwarding system, and the like. Preferably, this billing system and method also automatically charges the call to a predetermined telephone line even when the calling party places the call from a remote location. The billing system and method preferably includes a signal control point coupled to the calling party, the predetermined telephone line, and the service. Preferably, the signal control point is configured to implement the billing system and method such that the call placed by the calling party through the service is billed to the predetermined telephone line. A terminating attempt trigger within a switch associated with predetermined telephone line preferably directs this switch to record a duration of the call and a particular feature utilized for the call. As a result, this switch associated with the predetermined telephone line stores both the call duration and the particular feature associated with the call in a single record. Accordingly, the billing system and method does not need to perform additional steps or add further complexity to obtain both the call duration and the particular feature associated with the call. Further, the calling party is preferably capable of selecting the predetermined telephone line which serves as a telephone line to be billed.

23 Claims, 3 Drawing Sheets

U.S. PATENT DOCUMENTS

| | | | |
|---|---|---|---|
| 5,471,521 A | | 11/1995 | Minakami et al. ............ 379/88 |
| 5,479,489 A | | 12/1995 | O'Brien ........................ 379/67 |
| 5,487,111 A | | 1/1996 | Slusky ........................ 379/211 |
| 5,524,147 A | | 6/1996 | Bean ........................... 379/265 |
| 5,537,464 A | * | 7/1996 | Lewis et al. ........... 379/114.25 |
| 5,539,807 A | | 7/1996 | Ghisler et al. ................ 379/58 |
| 5,572,579 A | * | 11/1996 | Orriss et al. ........... 379/142.01 |
| 5,577,110 A | | 11/1996 | Aquino ........................ 379/201 |
| 5,583,920 A | | 12/1996 | Wheeler, Jr. ................. 379/88 |
| 5,596,573 A | | 1/1997 | Bertland ...................... 370/474 |
| 5,625,682 A | | 4/1997 | Gray et al. .................. 379/266 |
| 5,668,863 A | | 9/1997 | Bieselin et al. ............. 379/202 |
| 5,712,903 A | | 1/1998 | Bartholomew et al. ....... 379/89 |
| 5,732,216 A | | 3/1998 | Logan et al. .......... 395/200.33 |
| 5,737,725 A | | 4/1998 | Case ........................... 704/260 |
| 5,742,905 A | | 4/1998 | Pepe et al. .................. 455/461 |
| 5,751,794 A | * | 5/1998 | Kugell et al. ................. 379/89 |
| 5,761,312 A | * | 6/1998 | Zelikovitz et al. ............ 380/49 |
| 5,764,746 A | | 6/1998 | Reichelt ...................... 379/207 |
| 5,850,629 A | | 12/1998 | Holm et al. ................. 704/260 |
| 5,862,208 A | * | 1/1999 | MeLampy et al. .......... 379/212 |
| 5,896,441 A | | 4/1999 | Akazawa et al. ............... 379/9 |
| 5,922,045 A | | 7/1999 | Hanson ....................... 709/206 |
| 5,970,133 A | | 10/1999 | Salimando .................. 379/213 |
| 5,991,377 A | * | 11/1999 | Malik .......................... 379/114 |
| 5,995,613 A | * | 11/1999 | Goel et al. ............. 379/221.15 |
| 5,999,611 A | * | 12/1999 | Tatchell et al. ............. 379/211 |
| 6,016,336 A | | 1/2000 | Hanson ................... 379/88.23 |
| 6,061,432 A | | 5/2000 | Wallace et al. .......... 379/88.18 |
| 6,078,655 A | | 6/2000 | Fahrer et al. ............... 379/220 |
| 6,084,892 A | | 7/2000 | Benash et al. ............. 370/701 |
| 6,088,436 A | * | 7/2000 | Mashinsky .................. 379/207 |
| 6,160,877 A | * | 12/2000 | Tatchell et al. ............. 379/197 |
| 6,161,087 A | | 12/2000 | Wightman et al. .......... 704/215 |
| 6,163,855 A | | 12/2000 | Shrivastava et al. ........... 714/4 |
| 6,167,119 A | | 12/2000 | Bartholomew et al. .. 379/88.04 |
| 6,185,288 B1 | | 2/2001 | Wong ......................... 379/219 |
| 6,199,076 B1 | | 3/2001 | Logan et al. ............... 707/501 |
| 6,226,289 B1 | | 5/2001 | Williams .................... 370/385 |
| 6,229,880 B1 | | 5/2001 | Reformato et al. ...... 379/88.01 |
| 6,233,234 B1 | | 5/2001 | Curry et al. ................ 370/356 |
| 6,233,315 B1 | | 5/2001 | Reformato et al. ...... 379/88.01 |
| 6,282,270 B1 | | 8/2001 | Porter ..................... 379/88.17 |
| 6,289,090 B1 | | 9/2001 | Tessler et al. .............. 379/207 |
| 6,317,484 B1 | | 11/2001 | McAllister ............... 379/88.02 |
| 6,324,269 B1 | * | 11/2001 | Malik .................... 379/114.23 |
| 6,330,308 B1 | | 12/2001 | Cheston, III et al. .... 379/88.04 |
| 6,381,325 B1 | * | 4/2002 | Hanson ................. 379/218.01 |
| 6,389,126 B1 | | 5/2002 | Bjornberg et al. ..... 379/201.03 |
| 6,400,804 B1 | | 6/2002 | Bilder .......................... 379/76 |
| 6,424,647 B1 | | 7/2002 | Ng et al. ..................... 370/352 |
| 6,427,002 B2 | | 7/2002 | Campbell et al. ........ 379/88.01 |
| 6,442,169 B1 | | 8/2002 | Lewis ........................ 370/401 |
| 6,456,700 B1 | | 9/2002 | Malik ...................... 379/88.19 |
| 6,493,438 B1 | * | 12/2002 | Gross et al. ........... 379/114.22 |
| 6,650,737 B2 | | 11/2003 | Finnigan .................. 379/88.02 |

FOREIGN PATENT DOCUMENTS

| | | | | |
|---|---|---|---|---|
| JP | 10079785 | | 3/1998 | ............ H04M/1/57 |
| WO | WO 98/09421 | | 3/1998 | ............ H04M/3/42 |
| WO | WO 98/09422 | | 3/1998 | ............ H04M/3/42 |
| WO | WO 98/11704 | | 3/1998 | |
| WO | WO 99/29083 | | 6/1999 | ........... H04L/29/12 |

OTHER PUBLICATIONS

Cristina Delogu, et al., "Spectral Analysis of Synthetic Speech and Natural Speech with Noise Over the Telephone Line", Istituto Superiore Poste e Telecommunicazioni, v.le Europa 190, 00144 Roma, pg. 1409–1412.

Masanobu Abe, et al. "A New Framework to Produce Multimedia Content by Combining Synthesized Speech and Moving Pictures in the WWW Environment", NTT Cyber Space Labs, Japan, 1999, pp. 611–616.

Deixler, Lyle, "Iwatsu's New ADIX–S, This starter phone system can grow with your company", Mar. 1997, p. 44–45, Teleconnect, vol. 15, Issue 3.

T. Yoshida, N. Terashima, "A Conceptual Study of a Voice Conversation Facility in Intelligent NW Voice Mail," May 27–Jun. 1, p.129–136, Stockholm, Sweden.

* cited by examiner

SYSTEM AND METHOD OF BILLING A PREDETERMINED TELEPHONE LINE FOR SERVICE UTILIZED BY A CALLING PARTY

RELATED APPLICATIONS

This application claims priority under 35 U.S.C. § 119(e) of the U.S. provisional application Ser. No. 60/121,736 filed on Feb. 26, 1999 and entitled "Billing System and Method." The provisional application Ser. No. 60/121,736 filed on Feb. 26, 1999 and entitled "Billing System and Method" is also hereby incorporated by reference.

FIELD OF THE INVENTION

This invention relates to the field of telecommunications systems. More particularly, this invention relates to the field of billing calls placed within telecommunications systems employing intelligent networks.

BACKGROUND OF THE INVENTION

In the past, accurately billing telephone calls that occur through a service to a calling party was a slow, complex, and difficult process which had a high potential for errors. Prior art billing systems and methods typically rely on a "match and merge" billing system. In general, two main items are needed to perform accurate billing. First, a time duration of a particular event is needed. Secondly, identification of a particular feature that was utilized for this particular event is also needed. Outgoing calls, directory assistance, specialty services (ie. 900 and 976 numbers), and the like are examples of particular features.

For example, consider a user interacting with a voice mail system. In this example, the user listens to a message and desires to call the person that left the message (message leaver). In some prior systems the user would hang up and initiate a second call to the message leaver; such systems are not contemplated here. In other prior systems, the voice mail system can place the call to the message leaver for the user. As a result, the user has two concurrent active calls; a first call to the voice mail system and a second call, from the voice mail system to the message leaver, even though the user does not hang up between these calls. Generally, the telephony service provider desires charging the user for both these calls. One difficulty can arise owing to the location of the message leaver. Presume that the user's call to the voice mail system is a local call, but the call to the message leaver is a long distance call. The telephony service provide desires to charge the caller for the local call and also for the long distance call even though both calls occur at the same time.

The goal is to accurately bill the user for the call originating from the voice mail system to the recipient. In this example, the call from the voice mail system to the recipient allows the user and the recipient to communicate. According to this match and merge billing system, a switch which corresponds to outgoing calls from the voice mail system records a time duration and also a switch start time indicating a start time of this call from the voice mail system to the recipient. Further, the voice mail system records a voice mail start time indicating a start time of the call between the voice mail system and the recipient, and the voice mail system also records that the feature executed by the voice mail system in this example in an outgoing call. Recall that the two items which are essential for accurate billing are the time duration of a particular event and the feature which is utilized for the particular event. In order for the prior art billing systems to know both the required duration time and particular feature, the match and merge billing system must perform a match of the precise switch start time of the switch and the precise voice mail start time of the voice mail system. After a successful match between the switch start time and the voice mail start time, the match and merge billing system must finally merge the time duration and the particular feature of the particular event into a single record.

The prior art match and merge billing system relies on matching the switch start time and the voice mail start time together. Matching the switch start time and the voice mail start time is a somewhat unreliable process because matching the clocks belonging the voice mail system and the switch are very difficult. Additional error correction steps must be performed to increase reliability when matching start times running on different platforms. These additional steps add to the complexity and inefficiency of the prior art match and merge billing system.

The above example illustrates some of the complexities and uncertainty associated with the match and merge billing system. In particular, matching start times in order to accurately bill a single call requires numerous steps related to matching the start times and providing error correction. This results in additional complexity of the match and merge billing system. The complexities and inefficiencies of the match and merge billing system become amplified and even more substantial because many thousands of calls are placed through a service such as a voice mail system and need to be billed each day.

What is needed is an efficient and accurate billing system and method which seamlessly and automatically bills a predetermined telephone line for a call placed by a calling party to a called party through a service. What is further needed is a billing system and method that operates without needing to match start times of two or more services.

SUMMARY OF THE INVENTION

The present invention is a billing system and method that automatically charges a call to a predetermined telephone line when the call is placed by a calling party to a called party through a service. This service is any one or combination of a voice mail system, a call forwarding system, and the like. Preferably, this billing system and method also automatically charges the call to a predetermined telephone line even when the calling party places the call from a remote location, such as via a voice message system. The billing system and method preferably includes a signal control point coupled to the calling party, the predetermined telephone line, and the service. Preferably, the signal control point is configured to implement the billing system and method such that the call placed by the calling party through the service is billed to the predetermined telephone line. A terminating attempt trigger within a switch associated with predetermined telephone line preferably directs this switch to record a duration of the call and a particular feature utilized for the call. As a result, this switch, associated with the predetermined telephone line, stores both the call duration and the particular feature associated with the call in a single record. Accordingly, the billing system and method does not need to perform additional steps or add further complexity to obtain both the call duration and the particular feature associated with the call. Further, the calling party is preferably capable of selecting the predetermined telephone line which serves as a telephone line to be billed.

The billing system and method preferably provides seamless automated call billing to the predetermined telephone line regardless of where the calling party places the call and which service(s) the call is routed through. As a result, the billing system and method seamlessly bills the calling party at the predetermined telephone line for calls placed through the service(s). The billing system and method is preferably configured to operate within an Intelligent Network service. Further, by utilizing this billing system and method, a telephone company is capable of simplifying their billing process to accurately and efficiently charge the predetermined telephone line for the call placed through the service(s) by the calling party.

The present invention provides a billing system and method which seamlessly and automatically bills a predetermined telephone line for a call placed by a calling party to a called party through a service. Additionally, it provides a billing system and method which operates within an Intelligent Network system. Finally, it provides a billing system and method that obtains both the call duration and the particular feature for the call without matching start times and merging data from different sources.

DETAILED DESCRIPTION OF THE PREFERRED EMBODIMENT OF THE PRESENT INVENTION

Figure 1:
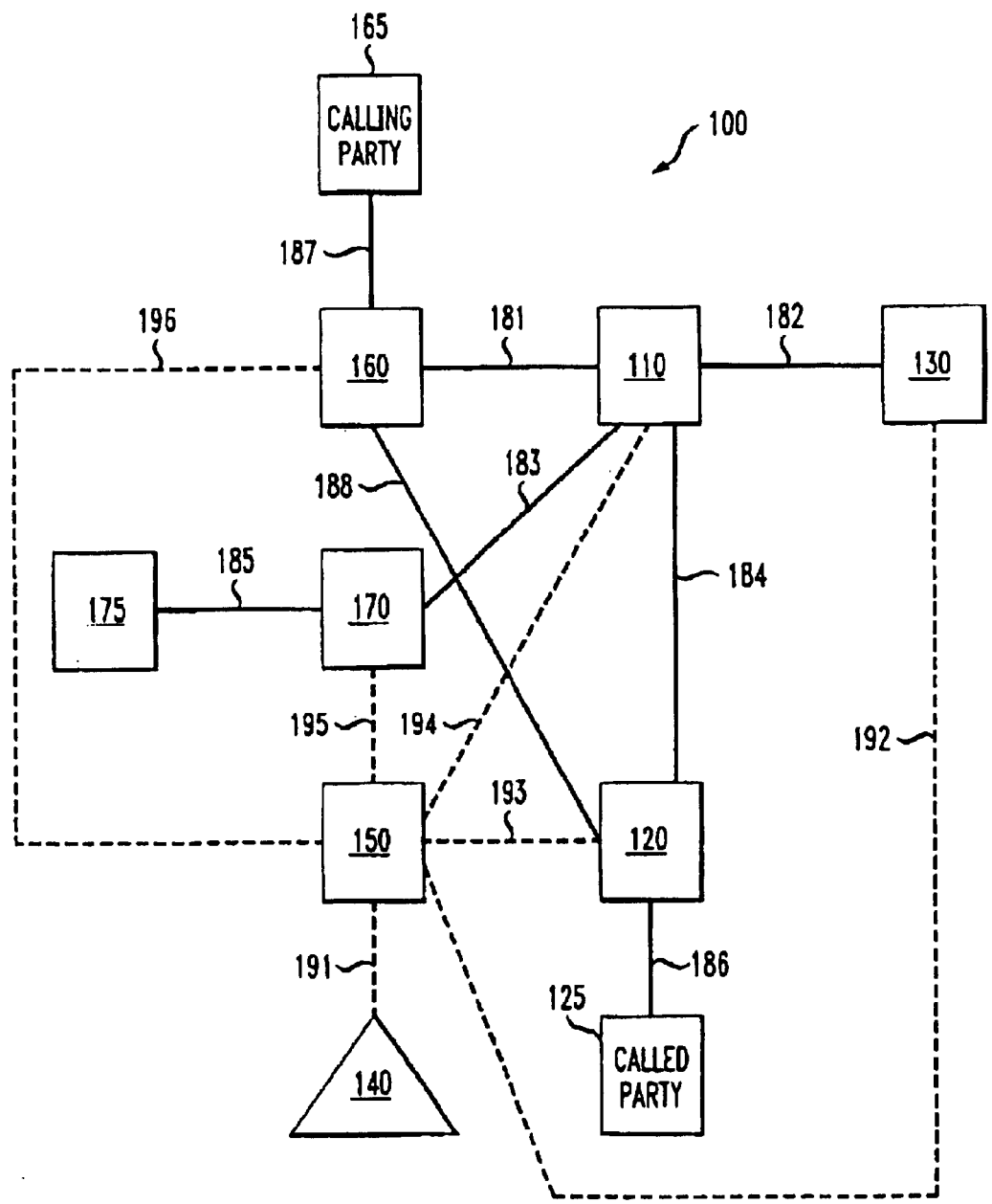
FIG. 1 illustrates a block diagram showing a telecommunication system configured for implementing a preferred embodiment of the present invention.

The present invention is a billing system that automatically charges a predetermined telephone line for a call which is placed by the user and also through a service. Preferably, the user is capable of setting any telephone line as this predetermined telephone line. FIG. 1 illustrates a block diagram showing an Intelligent Network system 100 configured for implementing a preferred embodiment of the present invention. The Intelligent Network system 100 is shown for exemplary purposes only. It will be apparent to those skilled in the art to modify, substitute, or add elements to the Intelligent Network system 100 without departing from the scope of the present invention.

The Intelligent Network system 100 preferably includes switches 110, 120, 160, and 170; a signal control point (SCP) 140; a signal system No. 7 (SS7) network 150; a voice mail system 130; a predetermined telephone line 175; a calling party 165; a called party 125; data links 181, 182, 183, 184, 185, 186, 187, and 188; and control links 191, 192, 193, 194, 195, and 196. Preferably, the switches 110 and 170 have advanced intelligent network (AIN) capabilities. More or fewer of these common elements can be added according to the invention.

In this preferred embodiment, the voice mail system 130 is preferably a full-featured voice mail system which is configured to store incoming messages, play stored messages, play outgoing messages, place outgoing calls, and the like. It will be apparent to those skilled in the art to substitute a different type of service such as call forwarding, directory assistance, specialty services (ie., 900 and 976 numbers), and the like in place of the voice mail system 130.

The SCP 140 preferably provides control signals to the voice mail system 130 and the switches 110, 120, 160, and 170, via the SS7 network 150. The switch 160 is preferably coupled to the calling party 165 via the data link 187, coupled to the SS7 network 150 via the control link 196, and coupled to the switch 110 via the data link 181. The switch 170 is preferably coupled to the predetermined telephone line 175 via the data link 185, coupled to the SS7 network 150 via the control link 195, and coupled to the switch 110 via the data link 183. The SCP 140 is preferably coupled to the SS7 network 150 via the control link 191. Preferably, the service 130 is coupled to the switch 110 via the data link 182 and coupled to the SS7 network via the control link 192. The switch 120 is preferably coupled to the calling party 125 via the data link 186, coupled to the switch 110 via the data link 184, and coupled to the SS7 network 150 via the control link 193. Preferably, the switches 160 and 120 are coupled together via the data link 188. It would be apparent to those skilled in the art to utilize additional or fewer data links and control links.

Figure 2:
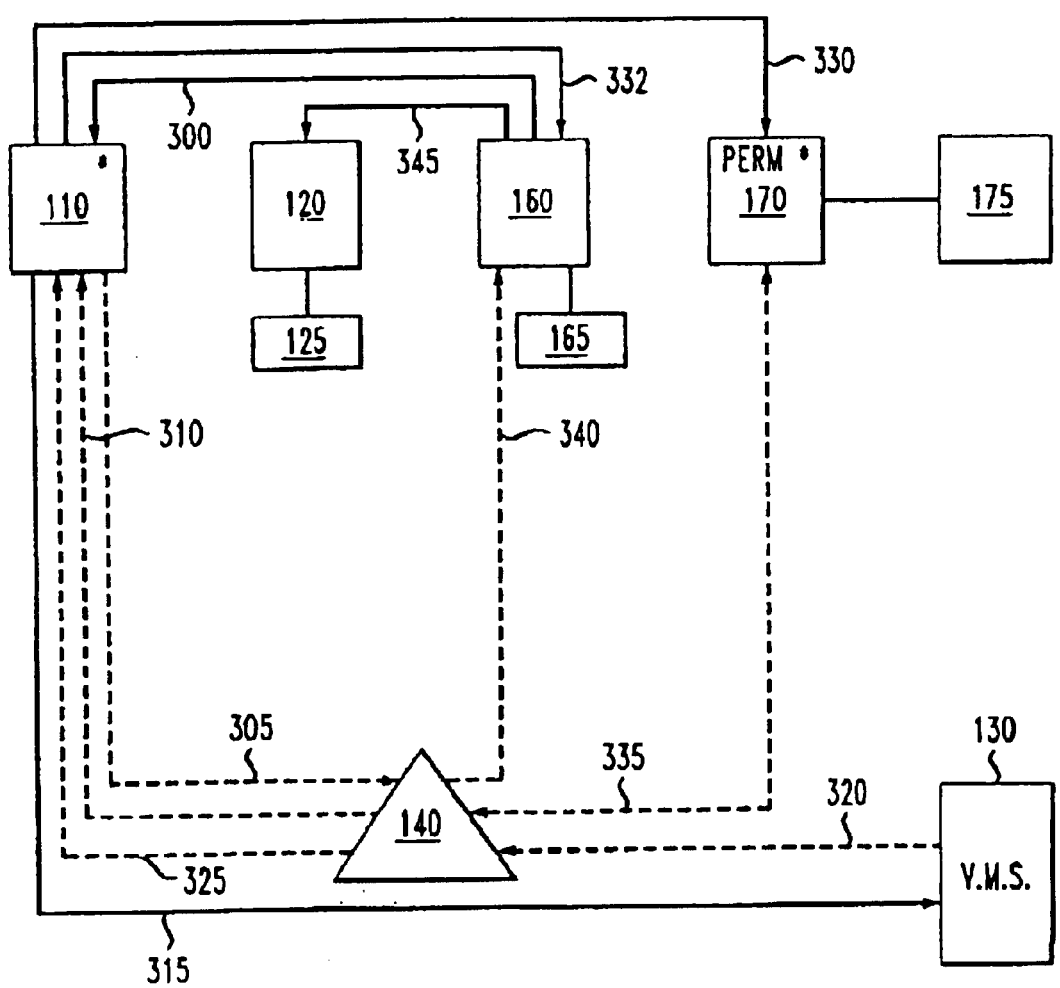
FIG. 2 illustrates a diagram showing a sample operation of the present invention interacting while utilizing a voice messaging system.

FIG. 2 illustrates a diagram showing a sample operation of the preferred embodiment of the present invention while utilizing a voice mail system 130. For the sake of simplicity and clarity common elements which are shared with those in FIG. 1 also share the same reference numerals. For example, the switches 110, 120, 160 and 170; the SCP 140; the calling part 165; the called party 125; the predetermined telephone line 175; and the service 130, are common in both FIGS. 1 and 2. Although the data links 181, 182, 183, 184, 185, 186, 187, and 188; and the control links 191, 192, 193, 194, and 195 are not shown in FIG. 2, the switches 110, 120, 160 and 170; the SCP 140; the SCP 140; and the service 130 are linked together as shown in FIG. 1.

Preferably, the diagram in FIG. 2 illustrates steps which are taken by preferred embodiment of the present invention to automatically and seamlessly reconfigure a call placed by the calling party 165 through the voice mail system 130 such that, for billing purposes, this call appears to originate from a predetermined telephone line 175. Further, the preferred embodiment is configured to store both the duration of this call and the particular feature utilized during this call in a single location without matching start times from different sources and error correction associated with the same. Additionally, the preferred embodiment is capable of billing this call to the predetermined telephone line 175 even when the calling party 165 is in a remote location which is different from the predetermined telephone line 175.

In particular, the diagram in FIG. 2 preferably illustrates how the present invention allows the calling party 165 to place call through the voice mail system 130 from the switch 160. Further, this call is automatically and seamlessly billed to the predetermined telephone line 175 which in this case is through the switch 170.

In FIG. 2, solid arrows preferably represent a path of a call and dotted arrows preferably represent a path of a control signal. First, the calling party 165 places the call wherein the call preferably originates from the switch 160. This call is then preferably transferred to the switch 110 which is represented by a solid arrow 300. Next, as a result of an advanced Intelligent Network (AIN) trigger, the switch 110 queries the SCP 140 which is represented by a dotted arrow 305. The SCP 140 then preferably instructs the switch 110 to connect to the voice mail system 130 and transmits a particular address associated with the voice mail system 130 to the switch 110 which is represented by a dotted arrow 310. After receiving the particular address associated with the voice mail system 130, the switch 110 connects the calling party 165 to the voice mail system 130 which is represented by a solid arrow 315. This call, which is placed by the calling party 165, is preferably routed from the calling party 165 through the switches 110 and 160 and reaches the voice mail system 130 as represented by the solid arrows 300 and 315. At this point, the calling party 165 is capable of interacting with the voice mail system 130. The interaction with the voice mail system can occur via the key pad on the telephone or by voice using conventional voice recognition techniques.

Next, the voice mail system 130 is directed to connect the calling party 165 with the called party 125. At this point, this billing system and method does not allow the voice mail system 130 to directly connect with the called party 125. Instead, the present invention preferably directs the voice mail system 130 to convey information relating to the called party 125 to the SCP 140 which is represented by a dotted arrow 320. Preferably, the voice mail system 130 delivers this information relating to the called party to the SCP 140 using a protocol 1129. However, it will be apparent to those skilled in the art to substitute another protocol in place of the protocol 1129.

Next, the SCP 140 preferably instructs the switch 110 to route the call to the predetermined telephone line 175 through the switch 170. Recall that the predetermined telephone line 175 is previously selected by the calling party. These instructions from the SCP 140 to the switch 110 are represented by a dotted arrow 325. In response to these instructions, the call is transferred from the switch 110 to the switch 170 which is represented by a solid arrow 330. Recall from before that the switch 170 is coupled to the predetermined telephone line 175.

Next, the call to the switch 170 is terminated and the switch 110 then routes the call to the switch 160 which is represented by a solid arrow 332. The switch 170 associated with the predetermined telephone line 175 is preferably equipped with a terminating attempt trigger such that when the call is re-routed from the switch 170 to the switch 160, a query is preferably made to the SCP 140 and the terminating attempt trigger is activated. This query is represented by a dotted arrow 335. The SCP 140, based on information relating to the call identifies and communicates with the switch 170 that this call involves the calling party 165 accessing the voice mail system 130 and attempting to reach the called party 125 through the voice mail system 130 and that this call is to be billed to the predetermined telephone line 175. Further, in association with the predetermined telephone line 175, the switch 170 preferably stores the duration of this call and the particular feature utilized during this call. In other words, the SCP 140 knows that this call originates from the calling party 165 through the voice mail system 130 to reach the calling party 125. Through communication with the SCP 140, the switch 170 preferably stores the duration of this call and the particular feature utilized during this call. It is important to note that the billing system and method allows the calling party to be located at any location while interacting with the voice mail system 130.

Next, the SCP 140 instructs the switch 160 to route the call to the switch 120. These instructions from the SCP 140 to the switch 160 are represented by a dotted arrow 340. Upon receiving these instruction from the SCP 140, the switch 160 creates a new call from the switch 160 to the switch 120 which is represented by a solid arrow 345. As a result, the calling party which is coupled to the switch 160 can communicate with the called party which is coupled to the switch 120. Preferably, the solid arrow 345 represents a sole communication connection between the calling part and the called party.

Preferably, the present invention automatically performs all the data communications represented by the solid arrows (300, 315, 330, 332, and 345) and the control signal communications represented by the dotted arrows (305, 310, 320, 325, 335, and 340) between the switches (110, 120, 160, and 170), the voice mail system 130, and the SCP 140. In this example as shown in FIG. 2, the present invention automatically and seamlessly allows the calling party 165 to interact with the voice mail system 130 from any location and then to contact the called party 125 without interruption. Further, the present invention preferably stores both the call duration and the feature utilized for the call between the calling party 165 and the called party 125 within the switch 170 to accurately charge the predetermined telephone line 175. As a result, the billing system and method eliminates the need to match start times among different sources to obtain both the call duration and the feature utilized during a call.

Figure 3:
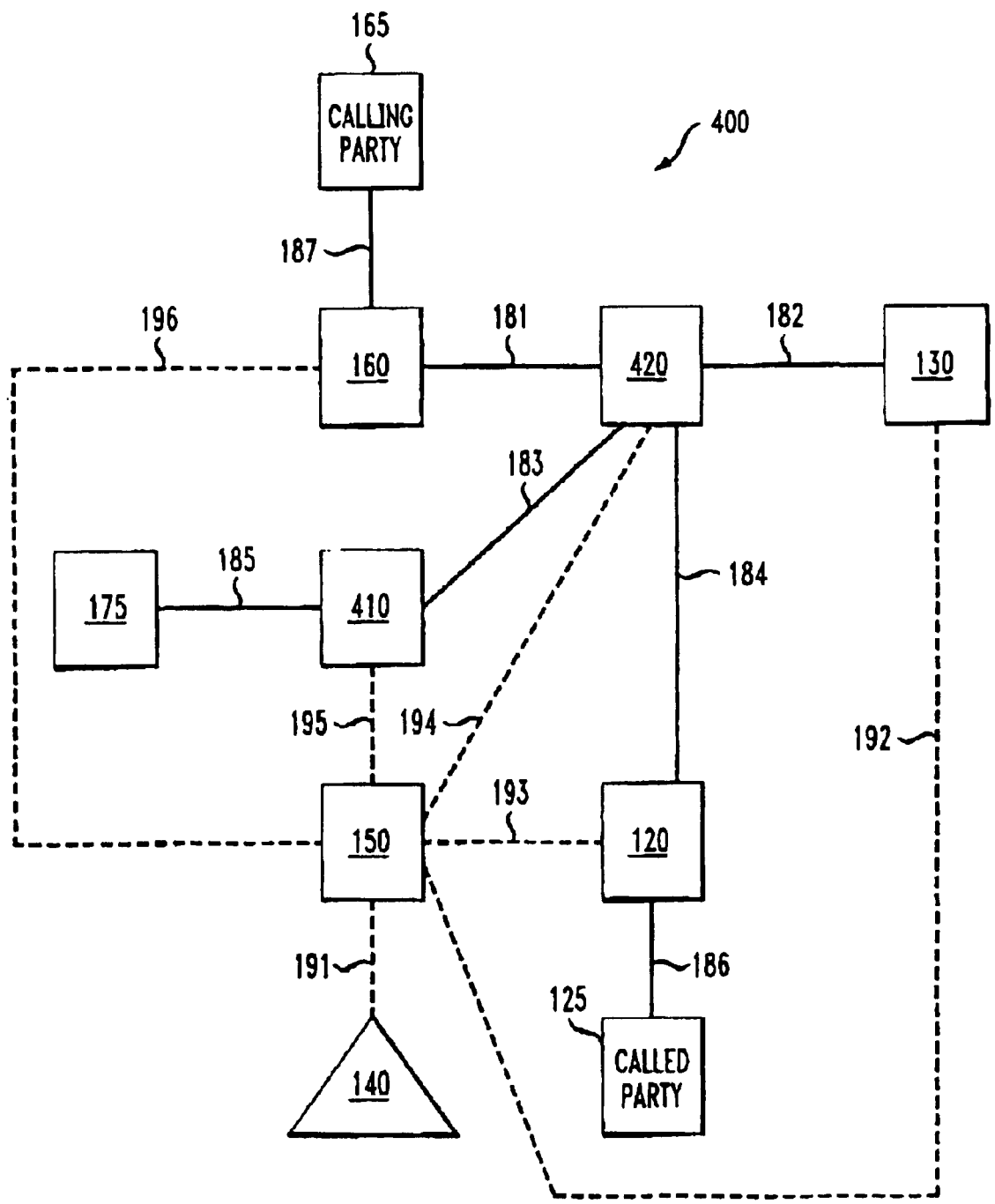
FIG. 3 illustrates a block diagram showing a telecommunications system configured for implementing an alternate embodiment of the present invention.

FIG. 3 illustrates a block diagram showing an alternate embodiment of the present invention within an Intelligent Network system 400. The Intelligent Network system 400 shares many common elements with the Intelligent Network system 100 (FIG. 1). For the sake of simplicity and clarity, common elements share the same reference numerals. For example, the switches 120 and 160; the SCP 140; and the service 130, are common in both FIGS. 1 and 3. Further, the data links 181, 182, 183, 184, 185, 186, and 187; and the control links 191, 192, 193, 194, and 195 are common to both FIGS. 1 and 3. It is important to note that a switch 420 is substituted in place of the switch 110 (FIG. 1), and a switch 410 is substituted in place of the switch 170 (FIG. 1). The principal difference between the switches 410 and 420 compared to the switches 110 and 170 (FIG. 1) is that the switches 410 and 420 do not have AIN capabilities.

In operation, after the calling party 165 connects with the voice mail system 130 and the voice mail system 130 determines that a call needs to be forwarded to the called party 125, the voice mail system 130 then conveys an address associated with the called party 125 to the switch 420. Next, the switch 420 calls the predetermined telephone line 175 and also bridges the calling party 165 to the predetermined telephone line 175. Next, the terminating attempt trigger is activated. From here, the billing system and method follows the query to the SCP 140 as described above and represented by the dotted arrow 355 as shown in FIG. 2.

The present invention is not limited to interacting through a voice mail system. Instead, the present invention is configured to allow the calling party to reach the called party through any other type of service such as call forwarding, remote dialing, automated assistant, and the like.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiments chosen for illustration without departing from the spirit and scope of the invention.

Specifically, it will be apparent to one of ordinary skill in the art that the device of the present invention could be implemented in several different ways and the billing system and method disclosed above is only illustrative of several embodiments of the invention and is in no way a limitation.

What is claimed is:

1. A billing system for automatically charging a call to a predetermined telephone line, the billing system comprising:

a. a service configured to receive an incoming call from a calling party and to initiate an outgoing call to a called party;

b. a switch coupled to the predetermined telephone line configured to store billing information in response to a triggering event; and c. a control point coupled to the service, the calling party, and the switch wherein the control point is configured to activate the triggering event in response to receiving an appropriate signal from the service and to transfer the incoming call from the service to the called party such that the calling party and the called party are connected thereby forming the outgoing call, wherein the billing information corresponding to the outgoing call is stored in the switch and the stored billing information is used to charge the predetermined telephone line.

2. The billing system according to claim 1 wherein the service is a voice messaging system.

3. The billing system according to claim 1 further comprising an additional switch coupled to the control point configured to transfer the call from the service to the called party wherein the calling party and the called party are connected and the service is disconnected.

4. The billing system according to claim 1 wherein the predetermined telephone line is set as a specific telephone line by the calling party.

5. The billing system according to claim 1 wherein the control point activates the triggering event in response to the service initiating the outgoing call to the called party.

6. The billing system according to claim 1 wherein the switch is configured to transfer the call from the service to the called party wherein the calling party and the called party are connected and the service is disconnected.

7. The billing system according to claim 1 wherein the stored billing information includes a call duration of the new call and a particular feature utilized during the new call.

8. The billing system according to claim 1 wherein the calling party is not at the predetermined telephone line.

9. The billing system according to claim 1 wherein the calling party is the predetermined telephone line.

10. A method of billing a call to a predetermined telephone line wherein a user initiates the call from a calling party to a called party through a service, comprising the following steps:

a. configuring a service to receive an incoming call from a calling party and to initiate an outgoing call to a called party;

b. configuring a switch to store billing information in response to a triggering event; and c. configuring a control point to activate the triggering event in response to receiving an appropriate signal from the service and to transfer the incoming call from the service to the called party such that the calling party and the called party are connected thereby forming the outgoing call, wherein the billing information corresponding to the outgoing call is stored in the switch and the stored billing information is used to charge the predetermined telephone line.

11. The method according to claim 10 further comprising activating a terminating attempt trigger in the switch associated with the predetermined telephone line.

12. The method according to claim 11 wherein storing billing information on the switch is in response to activating the terminating attempt trigger.

13. The method according to claim 12 wherein the stored billing information includes a call duration of the new call and a particular feature utilized during the new call.

14. The method according to claim 10 further comprising setting a telephone line as the predetermined telephone line.

15. The method according to claim 10 wherein the calling party is not at the predetermined telephone line.

16. The method according to claim 10 wherein the calling party is the predetermined telephone line.

17. A method of billing a call to a predetermined telephone line wherein a user initiates the call through a service from a calling party to a called party, comprising the following steps:

a. receiving an incoming call from the calling party by the service;

b. sending a signal from the service to a control point;

c. activating a triggering event in a switch associated with the predetermined telephone line by the control point in response to receiving the signal from the service;

d. transferring the incoming call from the service to the called party such that the calling party and the called party are connected, thereby forming an outgoing call; and e. storing billing information corresponding to the outgoing call in the switch, wherein the billing information is used to charge the predetermined telephone line.

18. The method according to claim 17 further comprising temporarily connecting the incoming call to the predetermined telephone.

19. The method according to claim 18 further comprising the following steps:

a. terminating the incoming call to the predetermined telephone line; and b. automatically querying the control point via a terminating attempt trigger located within the switch associated with the predetermined telephone line in response to terminating the incoming call to the predetermined telephone line.

20. The method according to claim 19 wherein storing the billing information related to the outgoing call on the switch is in response to querying the control point.

21. The method according to claim 20 wherein the stored billing information includes a call duration of the outgoing call and a particular feature utilized during the outgoing call.

22. The method according to claim 17 wherein the calling party is not at the predetermined telephone line.

23. The method according to claim 17 wherein the calling party is the predetermined telephone line.

* * * * *

UNITED STATES PATENT AND TRADEMARK OFFICE
CERTIFICATE OF CORRECTION

PATENT NO. : 6,925,159 B1
DATED : August 2, 2005
INVENTOR(S) : Connie Blackburn et al.

It is certified that error appears in the above-identified patent and that said Letters Patent is hereby corrected as shown below:

Column 3,
Lines 22-23, replace "telecommunication system" with -- telecommunications system --.

Column 4,
Line 23, replace "part 165;" with -- party 165; --.

Column 5,
Line 64, replace "calling part and" with -- calling party and --.

Signed and Sealed this

Fourth Day of October, 2005

JON W. DUDAS
*Director of the United States Patent and Trademark Office*